United States Patent [19]
Narad

[11] Patent Number: 5,560,019
[45] Date of Patent: Sep. 24, 1996

[54] METHOD AND APPARATUS FOR HANDLING INTERRUPTS IN A MULTIPROCESSOR COMPUTER SYSTEM

[75] Inventor: Charles E. Narad, Santa Clara, Calif.

[73] Assignee: Sun Microsystems, Inc., Mountain View, Calif.

[21] Appl. No.: 586,539

[22] Filed: Jan. 16, 1996

Related U.S. Application Data

[63] Continuation of Ser. No. 320,280, Oct. 7, 1994, abandoned, which is a continuation of Ser. No. 767,023, Sep. 27, 1991, abandoned.

[51] Int. Cl.$^6$ .................................................. G06F 13/24
[52] U.S. Cl. .................... 395/733; 395/734; 395/735; 395/737; 395/739; 395/741; 395/800; 364/DIG. 1; 364/DIG. 2
[58] Field of Search ............................... 395/800, 733, 395/734, 735, 737, 739, 741; 364/DIG. 1

[56] References Cited

U.S. PATENT DOCUMENTS

| | | | |
|---|---|---|---|
| 4,124,888 | 11/1978 | Washburn | 395/275 |
| 4,271,468 | 6/1981 | Christensen et al. | 364/200 |
| 4,349,873 | 9/1982 | Gunter et al. | 364/200 |
| 4,604,500 | 8/1986 | Brown et al. | 379/269 |
| 4,644,465 | 2/1987 | Imamura | 364/200 |
| 4,769,768 | 9/1988 | Bomba et al. | 395/725 |
| 4,779,195 | 10/1988 | James | 364/200 |
| 4,796,176 | 1/1989 | D'Amico et al. | 395/275 |
| 4,843,541 | 6/1989 | Bean et al. | 395/275 |
| 5,133,056 | 7/1992 | Miyamori | 395/275 |
| 5,222,215 | 6/1993 | Chou et al. | 395/275 |
| 5,283,904 | 2/1994 | Carson et al. | 395/725 |
| 5,287,523 | 2/1994 | Allison et al. | 395/725 |

OTHER PUBLICATIONS

D. Giroir, et al., "Interrupt Dispatching Method for Multi-processing System", Sep. 1984, *IBM Technical Disclosure Bulletin*, vol. 27, No. 4B, pp. 2356–2359.

A. Cantoni, B. E., Ph.D., "A Technique for Interrupt Distribution In A Multiprocessor System", Oct. 1982, *Software & Microsystems*, vol. 1, No. 6, pp. 153–159.

*Primary Examiner*—Daniel H. Pan
*Assistant Examiner*—Dzung C. Nguyen
*Attorney, Agent, or Firm*—Blakely Sokoloff Taylor & Zafman

[57] ABSTRACT

An interrupt steering control mechanism includes an interrupt target register storing a code identifying a particular interrupt target processor to receive undirected interrupts within a multiple processor computer system. The computer operating system assigns a particular processor to be a current interrupt target by writing the identifying processor code in to the interrupt target register. A system interrupt pending register permits any processor to ascertain whether an interrupt source has requested service. Each interrupt service request is assigned an interrupt priority determining when the particular processor will service the interrupt in relation to other interrupts pending for that processor. An interrupt target mask register permits the current interrupt target processor to delay service of the interrupt request until some later time, and any processor may assert ownership of the current interrupt target. Appropriate bits within a processor interrupt register for each processor indicates whether soft or hard directed interrupts at any priority level are pending for that processor. The processor identified to be the current interrupt target also receives pending hard undirected interrupts, as indicated by appropriate bits within a system interrupt pending register.

23 Claims, 5 Drawing Sheets

| Field | Description; applies to both SIPR and ITMR |
|---|---|
| VME | VME interrupts <7:1> |
| SBUS | SBus interrupts <7:1> |
| K | Keyboard/mouse SCC |
| S | Serial ports SCC |
| E | On-board Ethernet |
| A | Audio/ISDN |
| SC | On-board SCSI |
| T | Level-10 Timer/Counter |
| VI | On-board Video Interrupt |
| MI | Module Interrupt(future non-processor modules) |
| FL | Floppy disk interrupt |
| MA | Mask All interrupts. Does not affect the state of other mask bits<br>*Broadcast Interrupt Sources (level 15)* |
| V | VME asynchronous error (write buffer or IOC write-back err) |
| M | ECC Memory Error |
| I | M-to-S write buffer error |
| ME | Module Error (any module) |
| rsvd | read as 0's, writing has no effect |

FIG. 7

| Level | Sources |
|---|---|
| 1 | SOFTINT. 1 |
| 2 | SOFTINT. 2, VMEbus L1, Sbus L1 |
| 3 | SOFTINT. 3, VMEbus L2, Sbus L2 |
| 4 | SOFTINT. 4, on-board SCSI |
| 5 | SOFTINT. 5, VMEbus L3, Sbus L3 |
| 6 | SOFTINT. 6, on-board Ethernet |
| 7 | SOFTINT. 7, VMEbus L4, Sbus L4 |
| 8 | SOFTINT. 8, on-board video |
| 9 | SOFTINT. 9, VMEbus L5, Sbus L5, Module Interrupt (non-IU) |
| 10 | SOFTINT. 10, System Counter/Timer |
| 11 | SOFTINT. 11, VMEbus L6, Sbus L6, Floppy (PIO) |
| 12 | SOFTINT. 12, Keyboard/Mouse, Serial Ports |
| 13 | SOFTINT. 13, VMEbus L7, Sbus L7, ISDN Audio (PIO) |
| 14 | SOFTINT. 14, Per-processor counter/Timer |
| 15 | SOFTINT. 15, Asynch. Errors (broadcast) |

FIG. 8

METHOD AND APPARATUS FOR HANDLING INTERRUPTS IN A MULTIPROCESSOR COMPUTER SYSTEM

RELATED APPLICATIONS

This is a continuation of application Ser. No. 08/320,280 filed Oct. 7, 1994, now abandoned, which is a continuation of Ser. No. 07/767,023 filed on Sep. 27, 1991, now abandoned.

The present invention is related to the following applications: Ser. No. 07/767,112, entitled "Methods and Apparatus for A Register Providing Atomic Access to Set and Clear Individual Bits of Shared Registers Without Software Interlock", U.S. Pat. No. 5,287,503; Ser. No. 07/766,784, entitled "A Bus-To-Bus Interface For Preventing Data Incoherence In A Multiple Processor Computer System", U.S. Pat. No. 5,367,695; Ser. No. 07/766,834, entitled "Methods and Apparatus For Locking Arbitration on a Remote Bus" now abandoned; and Ser. No. 07/766,835, entitled "A Bus Arbitration Architecture Incorporating Deadlock Detection and Masking" now abandoned.

BACKGROUND OF THE INVENTION

1. Field of the Invention

The present invention relates to multiple processor computer architectures. More particularly, the present invention relates to a multiple processor architecture for dynamic steering of undirected system interrupts to a particular processor.

2. Art Background

In most computer systems, it is desirable and necessary to enable the processor to respond to device signals and conditions which arise during the operation of the computer system. Such signals and conditions may arise as a result of anticipated signal inputs from a variety of internal and external devices, or may arise as a result of an unexpected event or occurrence of condition. When an event or condition occurs which bears upon computer system operation, the source of such event or condition will issue an interrupt to the processor requesting that the event or condition be acknowledged and serviced. Because a number of devices may interact with the processor, a priority allocation scheme is necessary in order to permit the processor to respond to the appropriate interrupt in the proper order.

Many methods and architectures exist for directing interrupts in uniprocessor computer systems. In a single processor computer system, all interrupts are necessarily serviced by the single processor, the only constraint being the order in which the interrupts are serviced. Most frequently, interrupts are assigned a priority, and are serviced in either ascending or descending order. In more complex multiple processor computer systems, interrupt servicing may be described in terms of symmetric and asymmetric interrupt servicing conventions. In an asymmetric multiple processor computer system, all interrupts are centralized and are all directed to one particular processor chosen to handle interrupt service requests. In symmetric multiple processor systems on the other hand, interrupts may be directed to any processor, depending on computer system needs and tasks currently being executed by processors within the multiple processing architecture.

Interrupts may take one of three forms. There may be directed interrupts, which are sent to a particular processor by the requesting device. Directed interrupts may be either "hard", wherein the interrupts are issued by specific devices generating a hardware signal, or "soft", wherein the interrupt is generated by a particular processor and directed to another processor under software control. Because the requesting device has specified a processor which is to service the interrupt request, no decision is necessary where to direct the interrupt.

A second type of interrupt is the broadcast interrupt, which, when it occurs, is of consequence to every device operating within the computer system. Because broadcast interrupts potentially affect every device within the computer system, broadcast interrupts are issued to, and received by, every device within the computer. An example requiring a broadcast interrupt is a hardware failure such as a power supply failure, wherein it is desired to alert all devices in the computer system that a power fail condition will occur momentarily. Because both directed interrupts and broadcast interrupts do not require the determination of a particular processor for servicing the interrupt, there exist numerous architectures allocating the directed or broadcast interrupts to one or all of the several processors operating within the multiple processor computer system.

The third type of interrupt, the undirected interrupt, is the most frequently encountered interrupt in multiple processor computer systems. Undirected interrupts may be received from any of a wide variety of computer system devices, including disk controllers, tape controllers, serial and parallel I/O ports, and any other device which may be equally shared by any processor within the computer system. Prior art multiple processor architectures frequently assign a particular processor to service all of the undirected interrupts issued by system components and peripherals. A detraction of dedicating a single processor to service only undirected interrupt service requests is that such processor is not available for other general purpose processing. In particular, during periods of low or minimal interdevice communication but intensive numeric computation, a dedicated interrupt service processor could not participate in the numeric computation, and thereby could not improve overall computer system performance. Alternatively, prior art interrupt service routines intended for multiple processor architectures may force the undirected interrupt service request upon the first available processor, without regard to the task the processor is executing, or which interrupts may be most expediously processed.

As will be discussed below, the present invention provides methods and apparatus for dynamically allocating undirected interrupt service requests to any one of several processors present in the multiple processor architecture by implementing an interrupt target register which points the interrupt service request to a particular processor. Moreover, the present invention permits review of all pending undirected interrupts prior to allocation to a particular processor. It is therefore possible to assign undirected interrupt service requests to a processor which may be concurrently servicing an interrupt of similar priority. Flexible and dynamic assignment of undirected interrupt service requests to processors results in a more effective interrupt servicing mechanism, thereby improving overall system performance.

SUMMARY OF THE INVENTION

Methods and apparatus for dynamically steering undirected interrupt service requests within a multiple processor computer system are disclosed. The interrupt steering control mechanism includes an interrupt target register which stores a code identifying a particular interrupt target processor within the system. The computer operating system may assign a particular processor to be the current interrupt target by writing the corresponding processor number into an interrupt target register. Alternatively, another processor can assert control of pending interrupts by writing its own identification code into the interrupt target register. A system interrupt pending register permits any processor to determine whether any interrupt source has requested service. Each interrupt service request is assigned an interrupt priority, which priority determines when the particular processor will service that interrupt in relation to other interrupts pending for the particular processor. An interrupt mask register permits the current interrupt target processor to either service an interrupt request when it occurs, or mask the interrupt request and thereby delay service of the interrupt request until a later time. A processor interrupt register for each processor permits each processor to review all hard and soft interrupts pending for that processor. Appropriate bits within the processor interrupt register for each processor indicate whether soft or hard interrupts at any priority level are pending for that particular processor. Depending on bit values in the interrupt target register and the interrupt mask register, one of the processors in the computer system will service each interrupt request. The dynamic allocation of undirected interrupts permits the operating system to optimize computer system performance by assigning the best interrupt service algorithm at the best possible time.

BRIEF DESCRIPTION OF THE DRAWINGS

The objects, features, and advantages of the present invention will be apparent in the following detailed description in which.

DETAILED DESCRIPTION OF THE INVENTION

Methods and apparatus for dynamically steering undirected interrupts to a particular processor within a multiple processor computer system are disclosed. In the following description for purposes of explanation, specific numbers, materials and configurations are set forth in order to provide a thorough understanding of the present invention. However, it will be apparent to one skilled in the art that the present invention may be practised without these specific details. In other instances, well known systems are shown in diagrammatical or block diagram form in order not to obscure the present invention unnecessarily.

Throughout the following description, the term "register" will be used to describe a computer hardware circuit used to store digital data. Registers are commonly found in computer systems, and may vary in size from storing a single bit of data to registers storing multiple bytes or even multiple words of digital data. It is intended that the registers described in the present invention should operate with any computer hardware design and operating system according to generally known design principles. The undirected interrupt steering invention which is the subject of the present application is specifically intended to operate with multiple processor computer systems manufactured by Sun Microsystems, Inc., Mountain View, Calif. Exemplary machines with which the present invention is intended to operate are those machines designed according to Sun Microsystems Sun-4M architecture.

Moreover, the present invention encompasses aspects of co-pending application entitled "Methods and Apparatus for a Register Providing Atomic Access to Set and Clear Individual Bits of Shared Registers without Software Interlock", Ser. No. 07/767,122, Application of the atomic access register function will be described where appropriate.

Figure 1:
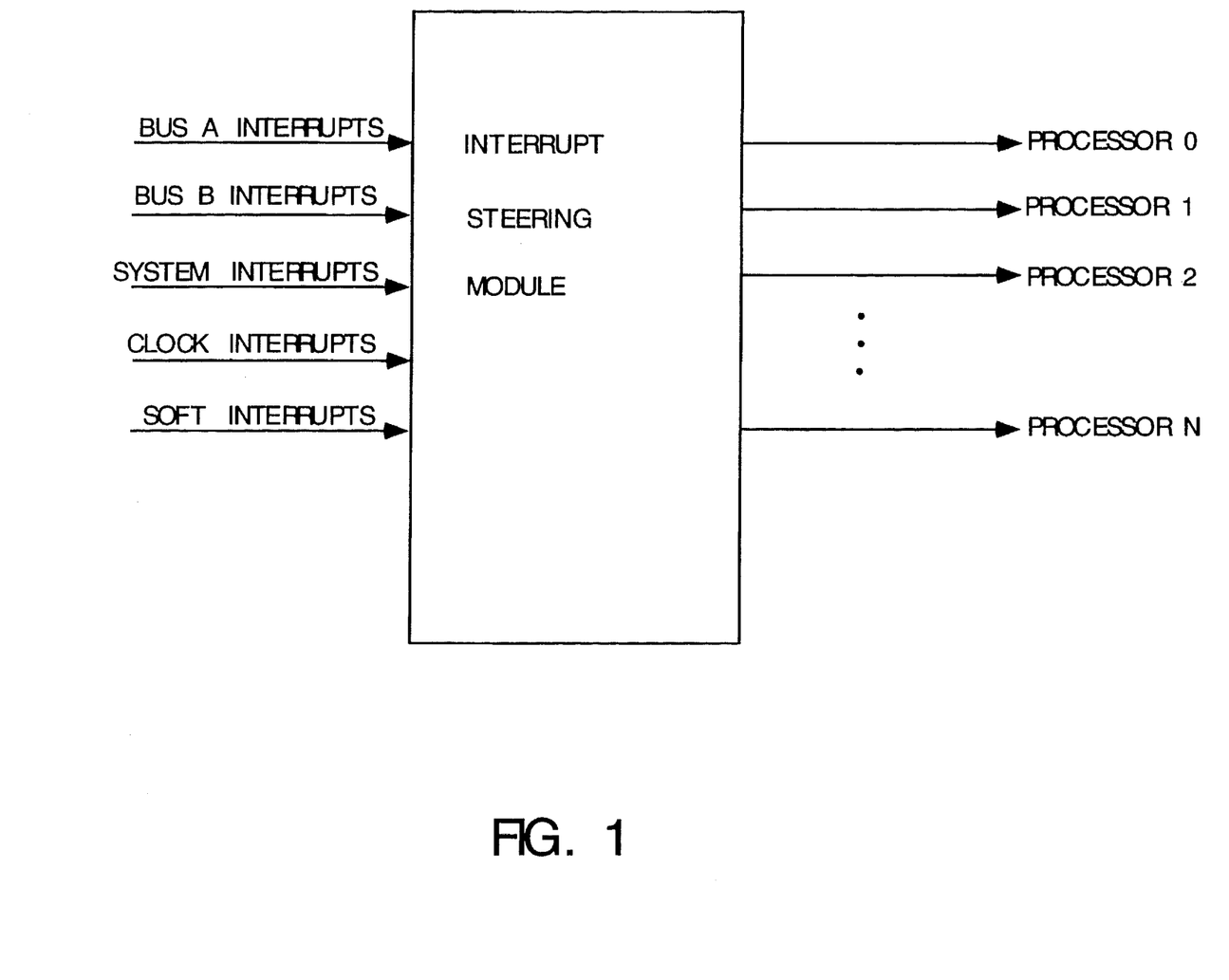
FIG. 1 illustrates the types of interrupts compatible with the present invention.

Referring now to FIG. 1, the interrupt service function of the present invention is shown. In FIG. 1, the interrupt steering module is seen to receive interrupts from any or all interrupt sources within the computer system, including:

timed interrupts, or CLOCK interrupts processor initiated interrupts, or SOFT interrupts interval device initiated interrupts, or SYSTEM interrupts devices communicating over an expansion bus., or BUS A and BUS B interrupts.

The interrupt steering module subsequently sends interrupts of the specified priority to one of a multiplicity of masters for service.

Figure 1A:
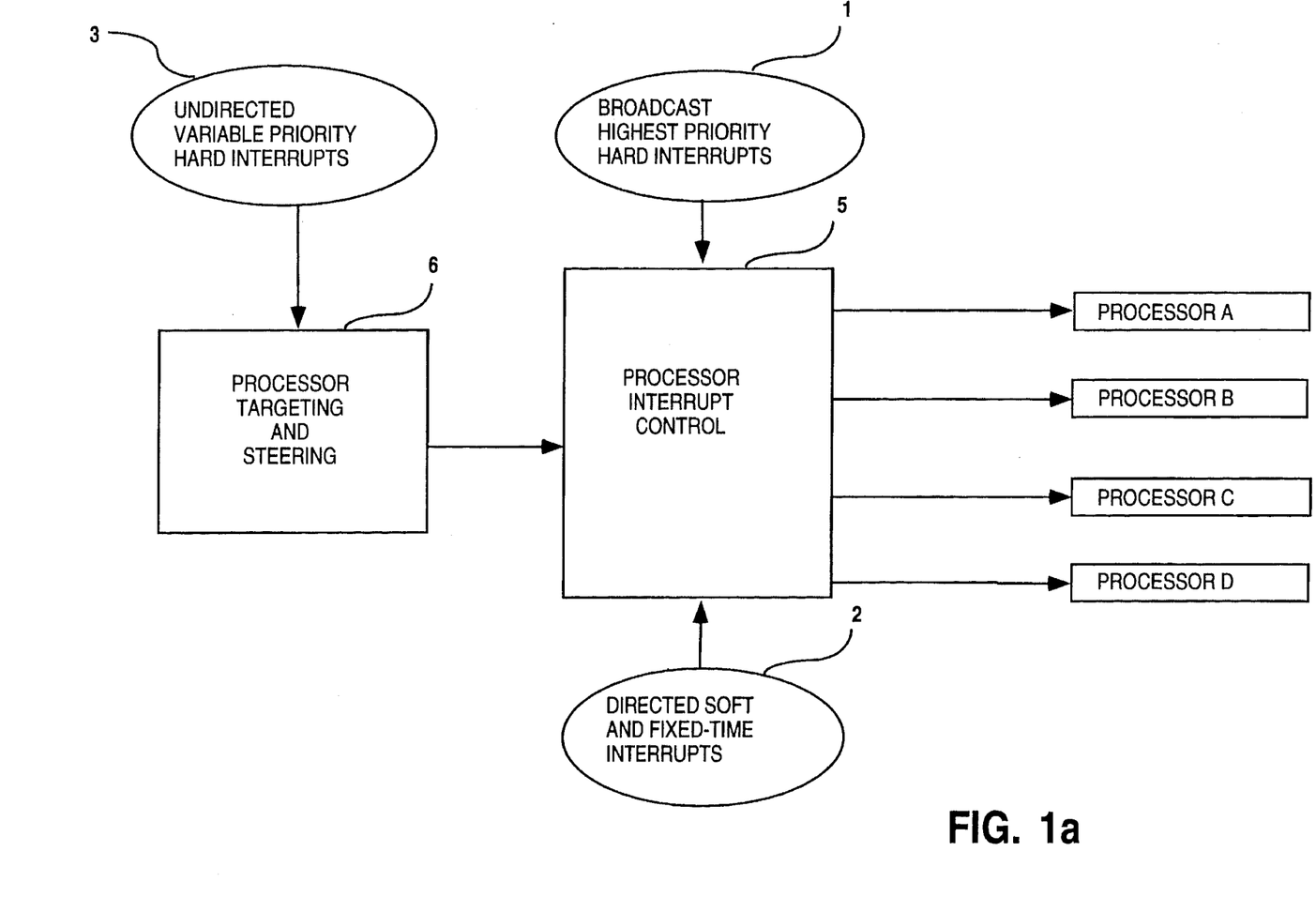
FIG. 1a is a generalized block diagram illustration of the undirected interrupt service modules comprising the undirected interrupt steering invention.

Referring now to FIG. 1a, a block diagram overview of the interrupt steering architecture which is the subject of the present invention is shown. In FIG. 1a, interrupt sources are seen to be of directed, broadcast, and undirected type. In FIG. 1a, it is seen that broadcast interrupts 1 and directed interrupts 2 are passed directly to processor interrupt control block 5. Undirected variable priority interrupts 3, sent by internal and external devices, are directed to a processor targeting and steering module 6. Processor targeting and steering module 6 receives all undirected interrupts and determines to which processor a particular interrupt will be directed. Processor targeting and steering module 6 transmits output signals indicating which processor is to receive the interrupt to processor interrupt control module 5. Processor interrupt control module 5 is connected to all processors in the computer system. As presently preferred, processor interrupt control module 5 is connected to four processors, namely processor A, processor B, processor C and processor D. Processor interrupt control block 5 also contains processor encoding logic so that the interrupt level of the highest priority interrupt pending be properly directed to the processor for each correct processor, and the highest priority interrupt including undirected interrupts may be properly steered to the processor selected by processor targeting and steering block 6.

Figure 2:
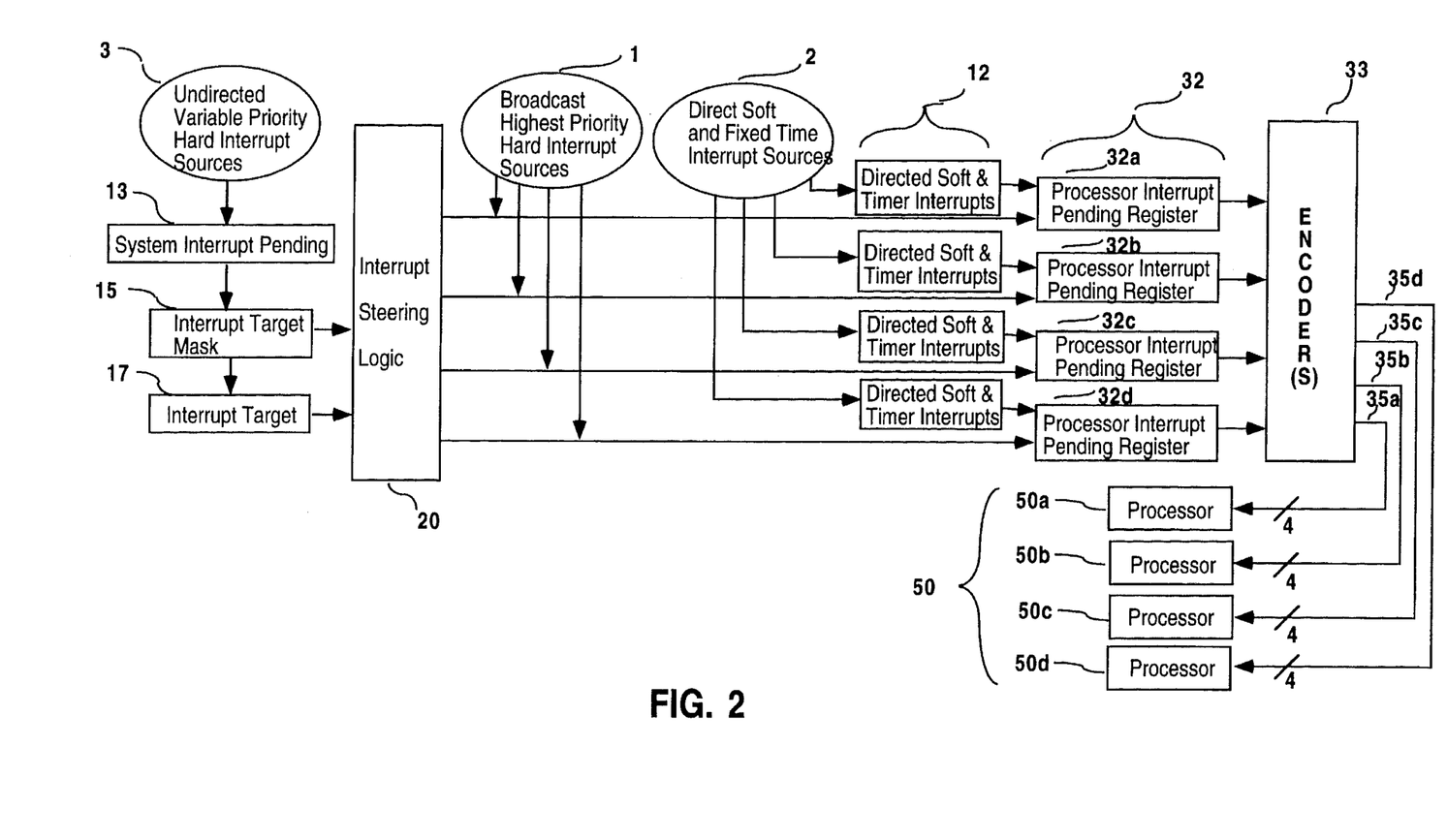
FIG. 2 is a diagrammatic illustration of the interrupt steering architecture.
Figure 5:
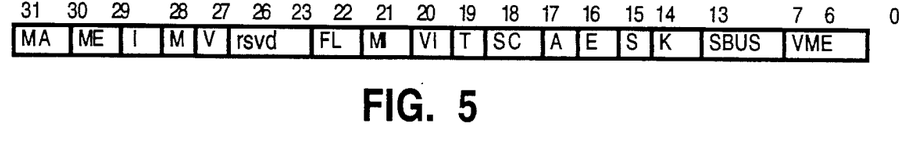
FIG. 5 is a diagrammatic representation of the interrupt target mask register of the preferred embodiment of the present invention.

A more detailed illustration of the present invention is best shown in FIG. 2. In FIG. 2, undirected interrupts 3 received from any device are indicated by a system interrupt pending register 13. System interrupt pending register 13 may be any appropriate size to accommodate operation of a particular computer system. In the preferred embodiment, system interrupt pending register 13 is a 32-bit register, whose bit allocation is more particularly shown in FIGS. 6 and 7 below. System interrupt pending register 13 permits subsequent interrupt logic to review all hard interrupts which are pending for all processors within the computer system, and to direct a particular interrupt to one of a multiplicity of processors 50 which will most benefit the computer system operation. Significantly, bits are never "set" or "cleared" in system interrupt pending register 13. Rather, they indicate only the present status of the interrupt sources. Pending undirected interrupts 3 as shown by system interrupt pending register 13 may be subsequently masked, or blocked by an interrupt target mask register 15. In the preferred embodiment, interrupt target mask register 15 is a 32-bit atomic access register of the type more particularly described in above-referenced co-pending application Ser. No. 07/767,122, and having a bit allocation as shown in FIGS. 5 and 7. Setting particular bits within interrupt target mask register 15 permits service of selected interrupts bit processors 50 to be delayed or eliminated all together. Bits are set or cleared within interrupt target mask register 15 in accordance with the atomic access register structure disclosed in above referenced co-pending application Ser. No. 07/767,122.

Figure 6:
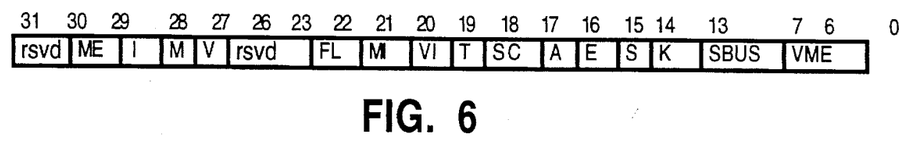
FIG. 6 is a diagrammatic illustration of the system interrupt pending register of the preferred embodiment of the present invention.
Figure 7:
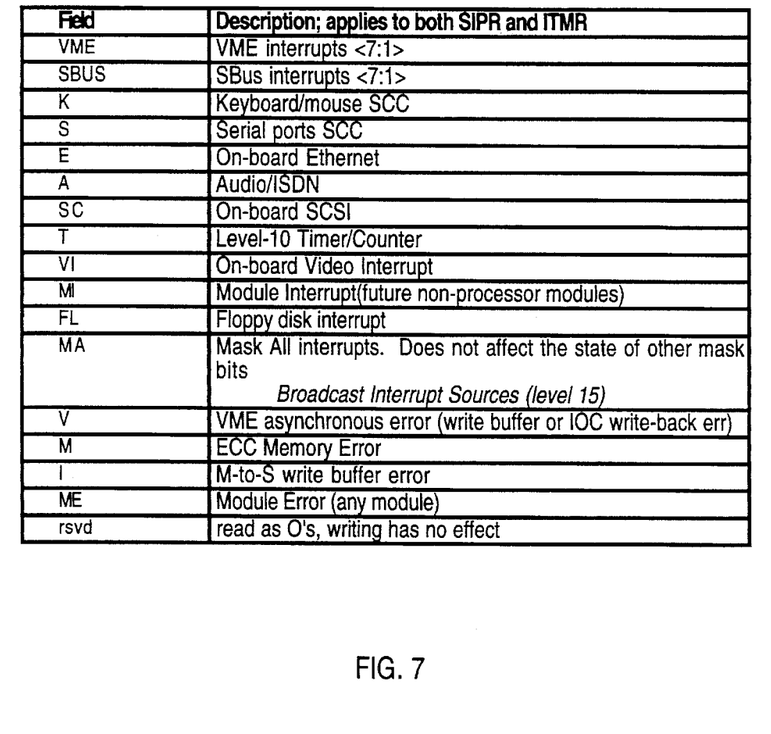
FIG. 7 is a legend describing bit assignments for the interrupt target mask register shown in FIG. 5 and the system interrupt pending register shown in FIG. 6.

Although particular interrupt sources have been assigned to particular bit locations within system interrupt pending register 13, as shown in FIG. 6, the reader will appreciate that any interrupt source could be assigned to any bit or combination of bits within system interrupt pending register 13, without regard to the particular 32-bit assignment shown in FIG. 6. With reference again to FIG. 2, interrupt target mask register 15 also is a 32-bit register, but has both read and write capability in accordance with the atomic access construct, wherein interrupt target mask register 15 has three addresses pointing to it. One address is assigned for reading, and one address each is assigned for setting and clearing individual bits within register 15. Undirected interrupts 3 issued by a device requesting service and indicated by system interrupt pending register 13 will have no effect on the processor intended to be the target interrupt service device when the corresponding bit within interrupt target mask register 15 is set.

Undirected interrupts 3 received by system interrupt pending register 13 and not masked or blocked by interrupt target mask register 15, are then passed to an interrupt steering logic unit 20. Individual bits within system interrupt pending register 13 indicate to interrupt steering logic unit 20 whether interrupt requests issued by any of the assigned interrupt sources are present.

Figure 4:
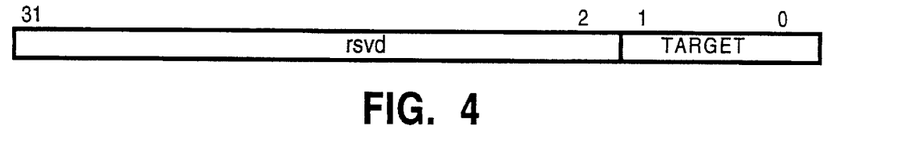
FIG. 4 is a diagrammatic representation of the interrupt target register in the present invention.

An interrupt target register 17 stores a binary processor identification code indicating which of processors 50 is intended to be a current interrupt target ("CIT") processor to service the interrupt request. FIG. 4 illustrates the presently preferred bit assignment for interrupt target register 17, wherein a two-bit code identifies which of four processors is to be the CIT processor. Functioning together, interrupt target mask register 15 and interrupt target register 17 act to support the allocation of undirected interrupts to different processors. As will be more particularly described below, when the CIT processor receives an interrupt request it can determine the source of the interrupt request by examining system interrupt pending register 13. If the CIT processor takes no further action, then the CIT processor will receive interrupt service requests directed to it by interrupt steering logic unit 20. Alternatively, if either bits 0 or 1 of interrupt target register 17 are changed, then the corresponding processor which has assigned to it the two-bit processor identification code now appearing in register 17 will be the newly assigned CIT processor, and will service the interrupt request. If the CIT processor wishes to schedule service of the pending interrupt on another processor, the CIT can atomically set the mask bit in interrupt target mask register 15 corresponding to the interrupt source requiring service, and thereafter send a directed interrupt to the desired processor. The masking function implemented by the atomic write-to-set to interrupt target mask register 15 permits the designated CIT processor to continue program execution without receiving an interrupt service request from the particular interrupt source masked against. When the selected interrupt service processor has completed servicing the interrupt, it will clear the mask bit set previously in interrupt target mask register 15 so that subsequent interrupts from the particular interrupt source will again be directed to the CIT processor.

Interrupt steering logic unit 20 will then, based upon the input by interrupt target mask register 15 and interrupt target register 17, direct the undirected interrupt along separate output lines to one of a multiplicity of processor interrupt registers 32. There is one processor interrupt pending register 32 for each processor in the multiple processor computer system. As shown in FIG. 2 in the presently preferred computer system comprising four processors, there are four processor interrupt pending registers 32, each corresponding to one of four processors 50. The highest priority broadcast hard interrupt sources 1 are also directed to the processor interrupt registers 32. As in the case of register 15, processor interrupt registers 32 are 32-bit registers with atomic read and write capability. In accordance with the set and clear atomic access register described above and in more detail in co-pending Ser. No. 07/767,122, multiple addresses are assigned to each physical register. In the preferred embodiment of the present invention, three distinct addresses are assigned to each of the processor interrupt registers 32 for each processor, resulting in three distinct functions upon the registers. One address accomplishes a read-only function, another address is a write-to-clear function, and the third address assigned is a write-to-set function.

Figure 3A:
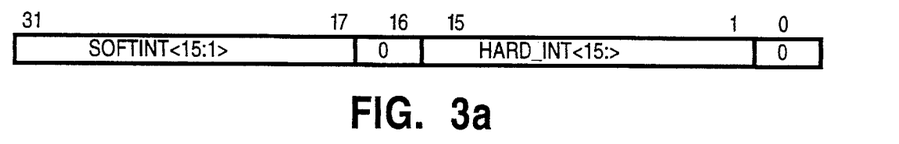
FIG. 3a illustrates the bit allocation for the registers of the preferred embodiment of the present invention during a read-only operation.

With reference to FIGS. 3a–c, the bit allocation for processor interrupt registers 32 is shown. As shown in FIG. 3a, during a read-only access, bit locations 1–15 of processor interrupt registers 32 indicate to the associated particular processor the priority level of hard directed interrupts pending, ranging from level 1–15 respectively. As is further shown in FIG. 3a, bits 17–31 of processor interrupt registers 32 indicate to the particular processor which of 15 levels of soft interrupts are pending for that processor. When read by a particular corresponding processor, all hard and soft interrupts pending for that processor will be shown.

Figure 3B:
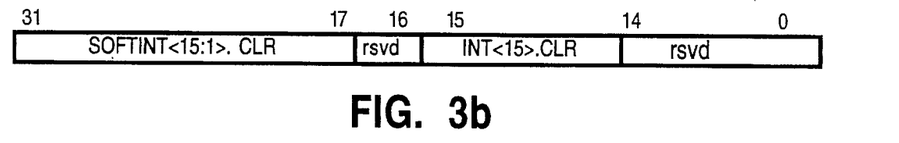
FIG. 3b represents the bit allocation for the registers of the preferred embodiment of the present invention during a write-to-clear operation.
Figure 3C:
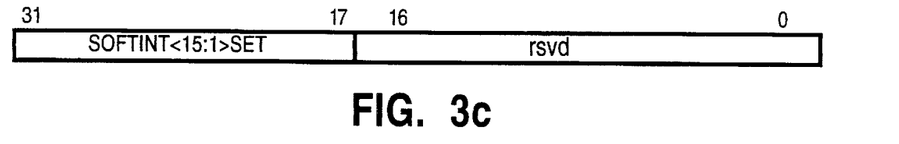
FIG. 3c represents the bit allocation for the registers of the preferred embodiment of the present invention during a write-to-set operation.

Further, as shown in FIG. 3c, for an atomic write-to-set function, one or more bits 17–31 in corresponding processor interrupt registers 32 may be set to logic 1 by atomically writing to the processor interrupt registers 32 using the SET address. Setting any of bits 17–31 of the register shown in FIG. 3c to logic 1, results in sending a directed interrupt at the specified level to the corresponding processor. For example, if bit-31 of processor interrupt register 32a assigned to processor 50a is set, a directed interrupt at level-15 will be sent to processor 50a. Similarly, as illustrated in FIG. 3b, a write-to-clear function may be implemented by setting a particular bit to logic 1 and writing to the processor interrupt registers 32 via the CLEAR address. Writing to processor interrupt registers 32 via the CLEAR address causes the corresponding soft interrupt level bit to be cleared, acknowledging that interrupt for the associated processors 50. Accordingly, the set and clear atomic access mechanism allows for single operation atomic access to processor interrupt registers 32, thereby eliminating the need for mutual exclusion locks around such accesses. Speed and simplicity of the computer system are thereby enhanced.

It should be noted that hard interrupt bits 1–13 of processor interrupt registers 32 will be active only if the corresponding processor is specified to be the current interrupt target, or CIT, in the interrupt target register 17. Otherwise, hard interrupt bits 1–13 will be read as logic 0. Importantly, hard interrupt bits 1–13 are never "set"; rather, they reflect the current status of interrupts on the corresponding interrupt priority level if the particular processor is enabled to "receive" the interrupts via the interrupt target register 17. With reference to directed soft and fixed time interrupts 2 shown in FIG. 2, in the presently preferred embodiment directed interrupts comprising fixed time or counter-driven events may be implemented via hard bit-14 of processor interrupt register 32 of FIG. 2. Interrupts based on time or count typically find application in implementing a time slice on a computer system, or for purposes of generating a performance analysis on computer code. In the preferred embodiment the former is implemented as an undirected interrupt, while the latter is implemented as directed interrupts. Similarly, hard bit-15 of processor interrupt registers 32 is used to indicate system broadcast interrupts.

Figure 8:
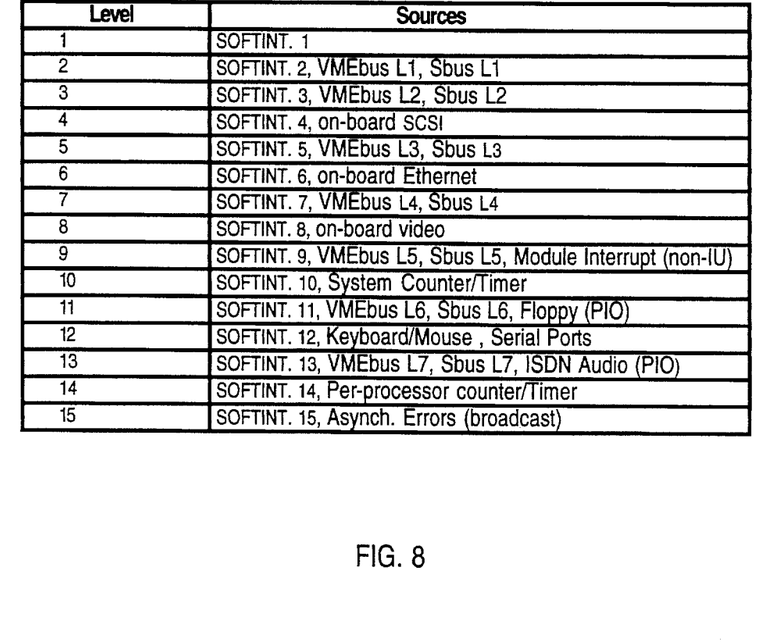
FIG. 8 is a legend describing the priority assignments for soft and hard interrupt sources of the preferred embodiment of the present invention.

As previously discussed, interrupt target register 17 will direct all undirected hard interrupts to the CIT indicated by the two-bit code contained within interrupt target register 17. In addition, soft interrupts may be directed to a designated target processor by one of the remaining processors setting an appropriate bit in the soft interrupt bits 17–31 of processor interrupt registers 32 corresponding to the particular one of processors 50 intended to service the soft interrupt. In both cases, interrupt signals are directed to either the CIT processor or the soft interrupt designated target processor via an encoder 33. As presently preferred, encoder 33 encodes the interrupt pending signals for each of the four processors 50 received from processor interrupt pending registers 32 into a four-bit code for each processor, accommodating a total of fifteen interrupt priority levels. Referring briefly to FIG. 8, and with particular reference to the SPARC systems of the preferred embodiment, interrupt priority level-15 is assigned to be the highest priority, whereas interrupt level-0 indicates there are no interrupts pending. Referring again to FIG. 2, interrupt signals sent to particular processors are output from encoder 33 to each of processors 50. The encoder 33 provides a private, unique 4-bit interrupt request line ("IRL") to each of processors 50. The IRL allows each processor to receive the highest pending interrupt assigned to it. CIT processor as assigned by interrupt target register 17, affects only the steering of undirected interrupts; each processor may have unique soft interrupts, director TIMER interrupts, or a BROADCAST interrupt pending at any time.

Having described the component pieces of the undirected interrupt steering architecture, operation of the system will now be described. Operation of the interrupt steering architecture accommodates all three types of interrupts which occur in multiple processor systems. In the present invention, directed interrupts are always posted to the same target processor 50 for servicing of the interrupt request. Directed interrupts may come from specific devices, from error conditions, or from soft interrupts posted from any of processors 50. Soft interrupts are posted via software by any one processors 50 to any of the remaining processors 50 at various interrupt priority levels, as shown in FIG. 8. Directed interrupts are sent to a particular one of processors 50 for servicing. The directed interrupts may be incorporated by choice or where system design constraints require that a particular processor for speed or other reason service the interrupt request.

Undirected interrupts may come from a system device, wherein interrupt steering logic unit 20 directs the interrupt to the CIT processor for servicing the request in a known manner. Thus, servicing of undirected interrupts may be shared among all processors 50 within the computer system employing the present invention. Significantly, in the present invention, in order to support more flexible interrupt service allocation algorithms, the CIT is programmable; that is, any one of the processors 50 in the system can be selected to receive all undirected interrupts. Broadcast interrupts are posted to all processors 50 in the computer system, including the processor initiating the posting if the broadcast interrupt is initiated by a processor. Broadcast interrupts may also be issued by hardware, e.g. system error detection logic. A broadcast interrupt may be issued at any interrupt priority level. If issued by a processor, broadcast interrupts may be implemented with a series of soft interrupts, one soft interrupt issued to each processor in the system. The operative effect of a broadcast interrupt is to set the same interrupt priority level for all processors 50 via the soft interrupt bits of interrupt registers 32 or via hard bit-15 of processor interrupt registers 32 for all processors 50.

Although any interrupt distribution scheme may be chosen by the system designer, the following distribution scheme is implemented in the preferred embodiment of the present invention, as shown in FIG. 2. Each of the four processors, 50a, 50b, 50c, and 50d receive directed interrupts for software profiling, implemented via soft interrupt level 14, the high resolution timer interrupt priority. Further, each of the four processors, 50a, 50b, 50c, and 50d has a facility to receive directed hard and soft interrupts on any priority level asserted via the processor interrupt registers 32a, 32b, 32c and 32d respectively. All undirected system interrupts will be sent to one of processors 50, indicated by interrupt target register 17 to be the current interrupt target, or CIT. The CIT can service the interrupt itself, or the CIT can subsequently schedule the undirected interrupt to be serviced by any remaining processors 50 via the directed interrupt mechanism and shared memory communication. All level-15 hard interrupts will be broadcast to all processors 50, and the assertion of any level-15 source will set the level-15 bit in each of processor interrupt registers 32. All processors 50 can acknowledge the assertion of the level-15 interrupt by writing-to-clear the level-15 hard interrupt bit within the corresponding processor interrupt pending registers 32.

For purposes of the following operational example, assume that processor 50a is the processor assigned to be the CIT. A two-bit binary processor identification code identifying processor 50a as the CIT will be stored in interrupt target register 17. So long as interrupt target register 17 stores the binary code representing processor 50a, all undirected interrupts received by the interrupt steering mechanism will be directed to processor 50a. Notwithstanding that a current interrupt target is identified by interrupt target register 17, interrupts received from the highest priority hard interrupt sources 1, namely broadcast interrupts, are distributed to all processors 50 within the computer system. That is, interrupts issued due to a write error, memory error, or other system error, are delivered equally to processor 50a, processor 50b, processor 50c and processor 50d. The occurrence of a broadcast interrupt is registered when a logical 1 appears in bit location 15 of all processor interrupt registers 32. Thus, processor 50a will recognize that a broadcast interrupt has been issued when bit-15 of processor 50a interrupt register 32a is logic 1. Similarly, processor 50b, processor 50c, and processor 50d will recognize that a broadcast interrupt has been issued when bit-15 of processor interrupt registers 32b, 32c, and 32d are set to logic 1 respectively. Recalling that processor 50a is the current interrupt target, a mechanism is provided wherein non-CIT processors 50b, 50c and 50d can acknowledge the occurrence of the interrupt without requiring that such processors actually service the interrupt. Acknowledgement is provided by atomically writing-to-clear bit-15 of the respective processor interrupt registers 32b, 32c, and 32d via the atomic access mechanism described above. Briefly stated, the atomic clearing or resetting of bit-15 is accomplished by a processor which is not the current interrupt target writing to the write-to-clear address, which points to the corresponding processor interrupt register associated with that processor. The write-to-clear instruction is accompanied by data whose binary equivalent value has a logic 1 in the binary data position corresponding to hard interrupt bit-15. In the current example, because processor 50a is assigned to be the current interrupt target, processor 50b, processor 50c and processor 50d may all acknowledge the level-15 broadcast interrupt received via their respective processor interrupt pending registers 32. Thus, in the case of processor 50b, if the write-to-clear address assigned to processor interrupt register 32b is, for example, ADDR4, the atomic write-to-clear instruction executed by processor 50b upon receipt of a level-15 broadcast interrupt would be: WRT ADDR4 8000H. Executing the atomic write-to-clear instruction with hexadecimal data equivalent to a logic 1 in the bit-15 location, causes the corresponding level-15 bit to be cleared in processor interrupt register 32b, thereby acknowledging the broadcast interrupt. Similar functions are implemented for all processors 50 and processor interrupt registers 32 within the computer system.

Still referring to FIG. 2, soft interrupts 2 may be directed to any of processors 50 by any processor atomically writing to set the register bit within soft interrupt registers 12 corresponding to the processor desired to service the soft interrupt. Physically, soft interrupt registers. 12 are one and the same as bit locations 17–31 of processor interrupt registers 32. Atomic writes-to-set to the soft interrupt registers 12 of any processors 50 with any of bits 17–31 set to logic 1 will cause the corresponding bit in the associated processor interrupt registers 32 to be set, thereby directing the interrupt at that level to the appropriate processor. Thus, in the case where processor 50a is the current interrupt target but where processor 50a determines that processor 50b shall service the next level 8 interrupt, processor 50a will execute an atomic write-to-set instruction with data setting bit 8 in the soft interrupt set field (bits 17–31) of processor 50b interrupt register 32b. The reader should note that the address for processor 50b interrupt pending register 32b is distinct from the address assigned to the write-to-set address for processor 50a interrupt register 32a, as well as distinct from the write-to-clear address for processor interrupt register 32b itself. Alternatively, any of the processors 50 may determine that it should be the current interrupt target rather than the presently assigned CIT as evidenced by the entry in interrupt target register 17. In such a case, any of processors 50 seeking to become the current interrupt target will write its identification code into interrupt target register 17, thereby displacing the old CIT. However, an "acquire" algorithm, wherein any processor obtains ownership of the CIT processor by writing its own identification code into the Interrupt Target Register 17, may cause the previous CIT to see a spurious interrupt. Servicing of spurious interrupts can degrade performance in a computer system. Therefore, a "relinquish" algorithm, wherein the current CIT processor assigns the CIT function to a new processor by writing that processor's identification code to the interrupt target register 17, is preferred.

The largest group of interrupts accommodated by the present invention come from undirected variable priority interrupt sources 3 as shown in FIG. 2. All interrupts which are not the highest level-15 system broadcast interrupts, the directed timer interrupts, or soft interrupt directed to a particular processor, will be evaluated and distributed via the system interrupt pending register 13, the interrupt target mask register 15, and the interrupt steering logic unit 20. Where, as in the present example, processor 50a is the current interrupt target and an interrupt is issued by, for example, a serial port, that serial port interrupt will be indicated by the serial port bit, bit-15 of system interrupt pending register 13, in accordance with the bit allocation for system interrupt pending register 13 shown in FIGS. 6 and 7. If no bits within interrupt target mask register 15 are set to mask the interrupt from the current interrupt target, the CIT, namely processor 50a, will service the serial port interrupt, bit-12 of processor interrupt register 32a showing the pending serial port interrupt indicated by system interrupt pending register 13. Assume now that, while processor 50a is servicing the serial port interrupt, a new interrupt is received from an SBus device, and shortly thereafter an interrupt from processor 50a timer-counter is received. Because processor 50a is still occupied with the previously received serial port interrupt service request, processor 50a cannot actively begin servicing the subsequent interrupts. However, system interrupt pending register 13 will register the occurrence of the SBus interrupt by showing a logical 1 in the appropriate bit location of system interrupt pending register 13, according to the assignment scheme illustrated in FIG. 6. Processor 50a interrupt pending register 32a will register the occurrence of the directed timer interrupt by showing a logic 1 in bit-14. In the present example, one of bits 7–13 of system interrupt pending register 13 will indicate to the CIT that an SBus device is requesting service.

Assuming that processor 50a has not masked any interrupts, processor 50a will service the pending interrupts according to their priority levels. Although in the presently preferred embodiment, the processor counter-timer is given higher priority than any SBus interrupt level, any prioritization scheme may be implemented with similar results. After processor 50a, has serviced the serial port interrupt, assume processor 50a determines that processor 50c shall service the next highest priority interrupt which may be assigned to any processor. In the present example, although the counter-timer interrupt pending for processor 50a is of higher priority, the counter-timer interrupt is processor-specific as to processor 50a and therefore cannot be directed to processor 50c. Rather, processor 50a will atomically write-to-set one of soft interrupt bits 17–31 of processor interrupt register 32c, according to the priority level of the SBus device, thereby setting the interrupt pending register for processor 50c. Similarly, processor 50a will atomically write-to-set the appropriate bit in interrupt target mask register 15. Interrupt target mask register 15 permits processor 50a to proceed with program execution, passing off service of the SBus device's interrupt to processor 50c. Processor 50a will likely leave a message for processor 50c in memory indicating which device to service. When processor 50c has serviced the SBus device, processor 50c will clear the appropriate mask bit in interrupt target mask register 15, again enabling processor 50a to receive interrupts from and to service that SBus device. Thus, processor 50c will receive the pending SBus interrupt at the particular level it is issued. Processor 50a, after completing service of the serial port interrupt, will also service the counter-timer interrupt directed to processor 50a by appearing as hard interrupt bit-14 in processor 50a interrupt register 32a. By setting the appropriate bit in interrupt target mask register 15, processor 50a will not "trap" the corresponding interrupt, e.g. the SBus interrupt, the interrupt instead being directed to the alternative processor, in this case processor 50c. Processor 50c is selected by processor 50a sending a directed interrupt to processor 50c by the atomic write-to-set function previously described, wherein the particular bit in processor 50c interrupt register 32c is set corresponding to the particular level of the SBus interrupt. Referring briefly to FIG. 3c, it should be noted that atomic write-to-set commands affect only the soft interrupt bit locations 17–31 of processor 50c interrupt register 32a. Conversely, the hard interrupt bits 1–15 of processor interrupt register 32 reflect only the current status of interrupts at the corresponding level if the processor is enabled to see the interrupts via the interrupt target register 17. Thus, by masking the interrupt from the SBus device and by forwarding the interrupt to processor 50c via a soft interrupt, processor 50a can schedule the servicing of that interrupt by another processor, while keeping ownership of general interrupt service by not altering the CIT. Conversely, if processor 50a determined it was too busy to service more hard interrupts, processor 50a could instead relinquish ownership of the CIT, and transfer the CIT function processor 50c by writing the identification code for processor 50c into the Interrupt Target Register 17. In that case, processor 50c, will receive all subsequent pending hard interrupts such as that from the SBus device, and processor 50c will choose whether to service or forward each interrupt.

In all cases, interrupts sent to processors 50, and indicated by the respective processor interrupt registers 32 are encoded via encoder 33 into a four-bit interrupt request level signal for each processor. The interrupt request level signal is put out on four interrupt request level communications paths unique to each of processors 50a, 50b, 50c, and 50d via interrupt request lines 35a–d. Processors 50a, 50b, 50c and 50d each have a four wire datapath interconnecting the processor to interrupt encoder 33, enabling each processor to respond to each of the fifteen levels of priority interrupt encoded by encoder 33.

Accordingly, the architecture which is the subject of the present application accommodates the fifteen distinct interrupt priority levels incorporated into the SPARC architecture.

The foregoing has described methods and apparatus for dynamically steering undirected interrupts to a particular processor within a multiple processor computer system. It is contemplated that changes and modifications may be made by one of ordinary skill in the art, to materials and arrangement of elements in the present invention without departing from the spirit and scope of the invention.

I claim:

1. In a computer system, an interrupt steering system for dynamically directing variable priority interrupt signals to any of a plurality of processors, each processor having a predetermined identification code, said identification code identifying that processor, said interrupt steering system comprising:

interrupt receiving means coupled to at least one system device for receiving said variable priority interrupt signals issued by said system devices;

a target interrupt processor identification register accessible to the processors, said processors programming the target interrupt processor identification register with the identification code of one of the processors to designate that processor as a target interrupt processor;

interrupt steering means coupled to said interrupt receiving means and the target interrupt processor identification register for directing said variable priority interrupt signals to the target interrupt processor;

a plurality of processor-specific interrupt pending notification registers coupled to said interrupt steering means for signalling said processors whenever said variable priority interrupt signals are pending, each said processor-specific interrupt pending notification means corresponding to one of said processors; and interrupt encoding means coupled to said interrupt pending notification means for converting said variable priority interrupt signals into a plurality of encoded processor-specific interrupts directed to said plurality of processors.

2. The interrupt steering system as set forth in claim 1, wherein said interrupt receiving means comprises a system interrupt pending register.

3. The interrupt steering system as set forth in claim 2, wherein said interrupt receiving means further comprises interrupt target masking means coupled to said interrupt steering means for variably blocking said variable priority interrupt signals.

4. The interrupt steering system as set forth in claim 3, wherein said interrupt target masking means further comprises an interrupt target masking register.

5. The interrupt steering system as set forth in claim 1, wherein said plurality of processor specific interrupt pending notification registers further comprises soft interrupt receiving means for receiving a plurality of soft interrupts generated by any of said processors.

6. The interrupt steering system as set forth in claim 5, wherein said soft interrupt receiving means comprises a plurality of atomic access registers, each said atomic access register comprising a plurality of bits altered according to a soft interrupt command written by one of said plurality of processors.

7. The interrupt steering system as set forth in claim 1, wherein said plurality of processor specific interrupt pending notification registers further comprises timer means for generating a plurality of timed interrupts for said plurality of processors.

8. The interrupt steering system as set forth in claim 1, wherein said plurality of processor specific interrupt pending notification registers further comprises broadcast interrupt receiving means for receiving a plurality of highest priority broadcast interrupt signals.

9. The interrupt steering system as set forth in claim 1, wherein said interrupt encoding means comprises a plurality of priority encoders encoding said variable priority interrupt signals to indicate a highest-level encoded processor-specific interrupt.

10. The interrupt steering system as set forth in claim 9, wherein said interrupt encoding means further comprises a plurality of interrupt request lines coupled to said processor encoding means and to said plurality of processors, said interrupt request line transmitting said variable priority interrupt signals indicating said highest-level encoded processor-specific interrupt to said processors.

11. The interrupt steering system as set forth in claim 1, wherein said interrupt steering means further comprises programmable interrupt target identification means for identifying a current interrupt target processor.

12. The interrupt steering system of claim 1 wherein each said processor-specific interrupt pending notification register includes a plurality of priority indicators, each priority indicator for specifying an interrupt priority level.

13. In a computer system, an interrupt steering system for dynamically directing a multiplicity of interrupts of unequal priority to any of a plurality of processors, each processor having a predetermined identification code, said identification code identifying that processor, said interrupt steering system comprising:

an interrupt pending register for receiving a plurality of assigned priority interrupt signals issued by at least one system device;

an interrupt target masking register for variably blocking said assigned priority interrupts, said interrupt target masking register coupled to said interrupt pending register and producing a plurality of masked priority interrupt signals;

a target interrupt processor identification register accessible to the processors, said processors programming the target interrupt processor identification register with the identification code of one of the processors to designate that processor as a target interrupt processor;

steering means coupled to the target interrupt for directing said plurality of assigned priority interrupt signals to the target interrupt processor, said steering means having an input connected to receive said plurality of masked priority interrupt signals from said interrupt target masking register;

a selected one of a plurality of processor-specific interrupt pending notification registers coupled to said steering means for notifying said target interrupt processor when said assigned priority interrupt signals are pending, each said processor-specific interrupt pending notification register corresponding to one of said processors, each said processor-specific interrupt pending register including a plurality of priority indicators, each indicator for specifying an interrupt priority level;

said plurality of processor interrupt pending registers further coupled to said plurality of system devices for receiving a plurality of highest priority broadcast interrupt signals;

a selected one of a plurality of processor specific directed interrupt receiving means including soft interrupt registers coupled to said plurality of processors for receiving a plurality of soft interrupt signals generated by any of said plurality of processors, said soft interrupt registers further coupled to said processor interrupt pending registers;

said plurality of directed interrupt receiving means further comprising timer interrupt means, coupled to said processor interrupt pending registers, for generating a plurality of timed interrupt signals for any of said plurality of processors;

processor encoding means coupled to said plurality of processor interrupt pending registers for converting said assigned priority interrupt signals, said soft interrupt signals, and said broadcast interrupt signals into a plurality of encoded processor-specific interrupt notification signals; and a plurality of interrupt request lines coupled to said processor encoding means, said interrupt request lines further coupled to said plurality of processors and transmitting said encoded processor-specific interrupt notification signals to said plurality of processors.

14. The interrupt steering system as set forth in claim 13, wherein said interrupt target masking register stores a code identifying said current interrupt target processor.

15. The interrupt steering system as set forth in claim 13, wherein said processor interrupt pending register comprises broadcast interrupt receiving means coupled to said plurality of system devices for receiving said plurality of highest priority interrupt signals.

16. The interrupt steering system as set forth in claim 13, wherein said processor encoding means comprises a plurality of priority encoders encoding said interrupt signals to indicate a highest-level encoded processor-specific interrupt.

17. In a computer system, a method for dynamically directing a multiplicity of interrupts of unequal priority to any of a plurality of processors, each processor having a predetermined identification code, said identification code identifying that processor, said method comprising the steps of:

receiving a plurality of assigned priority interrupt signals;

variably blocking said assigned priority interrupt signals and producing therefrom a plurality of masked priority interrupt signals;

providing steering means for directing said plurality of assigned priority interrupt signals to a current interrupt target processor, said steering means having an input connected to receive said plurality of masked priority interrupt signals;

providing a target interrupt processor identification register coupled to said steering means for identifying said current interrupt target processor, said target interrupt processor identification register accessible to the processors, said processors programming the target interrupt processor identification register with the identification code of one of the processors to designate that processor as a target interrupt processor;

receiving said processor-specific interrupt notification signals;

receiving a plurality of soft interrupts generated by any of said plurality of processors;

generating a plurality of timed interrupts for any of said plurality of processors; converting said processor-specific interrupt notification signals into a plurality of encoded processor-specific interrupt notification signals; and, transmitting said encoded processor-specific interrupt notification signals to said plurality of processors.

18. The method as set forth in claim 17, wherein said assigned priority interrupt signals are received by a register.

19. The method as set forth in claim 17, wherein variably blocking said assigned priority interrupt signals and producing therefrom a plurality of masked priority interrupt signals is accomplished by masking said assigned priority interrupt signals.

20. The method as set forth in claim 19, wherein masking said assigned priority interrupt signals is accomplished by setting at least one bit in an interrupt target mask register.

21. The method as set forth in claim 20, wherein providing said target interrupt processor identification register further comprises storing a code identifying said current interrupt target processor.

22. The interrupt steering system as set forth in claim 17, wherein receiving said processor-specific interrupt notification signals further comprises providing broadcast interrupt receiving means coupled to said plurality of system devices for receiving a plurality of highest priority interrupt signals.

23. The method as set forth in claim 17, wherein converting said processor-specific interrupt notification signals into a plurality of encoded processor-specific interrupt notification signals comprises providing a plurality of priority encoders.

* * * * *